Nov. 29, 1960  G. W. CHARBONEAU  2,962,044
AUTOMATIC GAS CUT OFF VALVE
Filed May 29, 1959

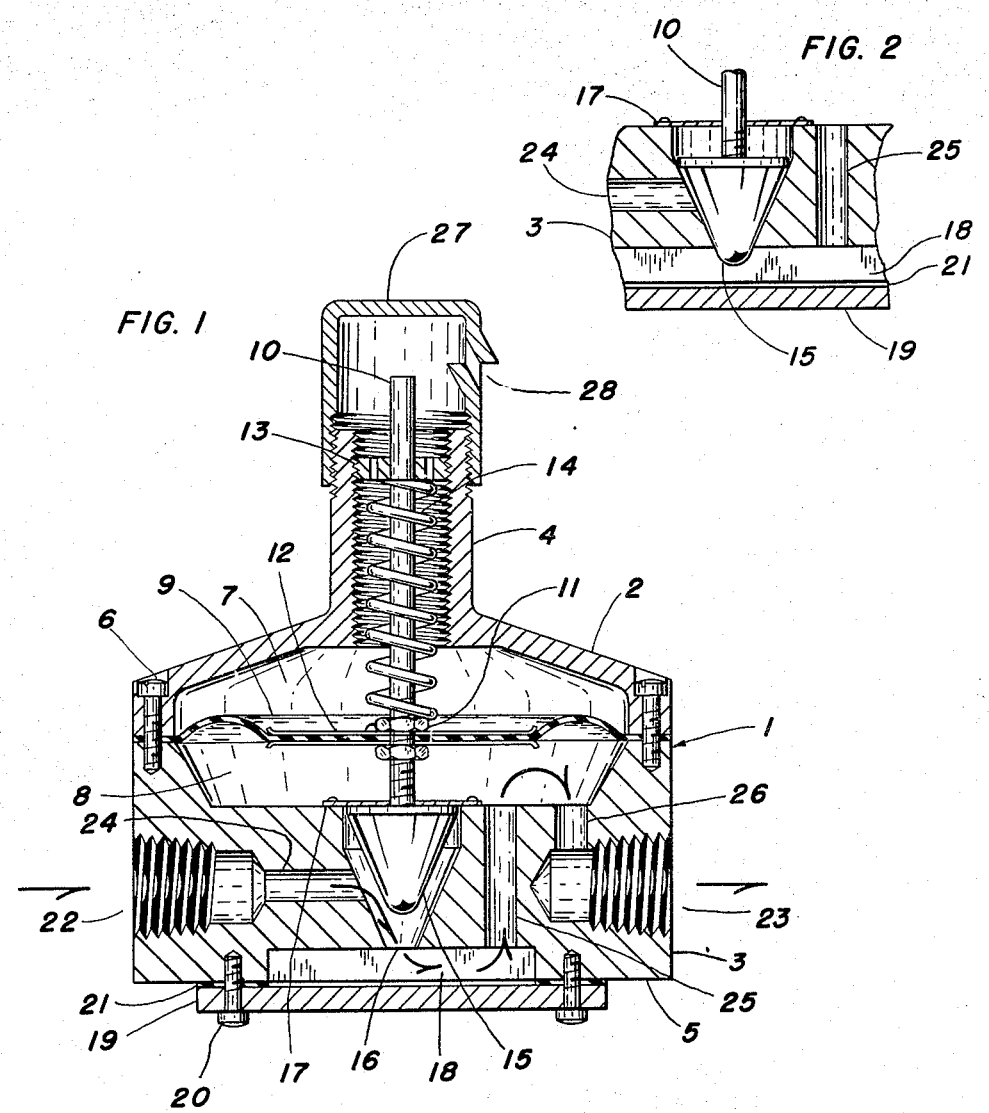

GILBERT W. CHARBONEAU
INVENTOR

ATTORNEY

2,962,044
AUTOMATIC GAS CUT OFF VALVE

Gilbert W. Charboneau, 835 Threadneedle St., Beaumont, Tex.

Filed May 29, 1959, Ser. No. 816,743

1 Claim. (Cl. 137—456)

This invention relates to an automatic gas cut off valve, and it concerns more particularly an automatic valve, responsive to the pressure of gas flowing thru a pipe, which is adapted to close when such pressure falls below a predetermined pressure.

A hazard is often created when the flow of fuel gas thru a gas supply pipe is interrupted for any reason, and thereafter resumed, whereby any flames resulting from the burning of such gas are exitnguished and unburned combustible gas, which is capable of being ignited with explosive results if confined, is discharged from the gas supply pipe.

An object of this invention is to provide an automatic cut off valve, for installation in fuel gas supply pipes, which is responsive to the pressure of gas flowing thru a pipe and is adapted to close automatically upon interruption of the flow of gas thru the pipe.

Another object of the invention is to provide an automatic gas cut off valve which is of simple, sturdy construction, may be manufactured inexpensively, and is efficient in operation and durable in use.

The invention will be readily understood by referring to the following description and the acocmpanying drawing, in which:

Fig. 1 is a sectional elevational view, taken on a median line, of an automatic gas cut off valve embodying the invention, showing the valve in its open position;

Fig. 2 is a fragmentary view showing the valve in its closed position;

Figure 3:
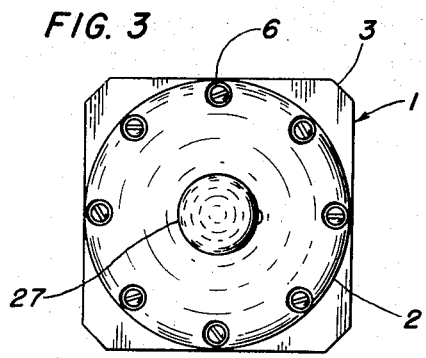
Fig. 3 is a top plan view.
Figure 4:
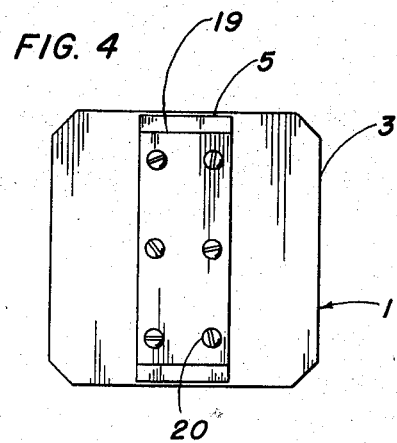
Fig. 4 is a bottom plan view.
Figure 5:
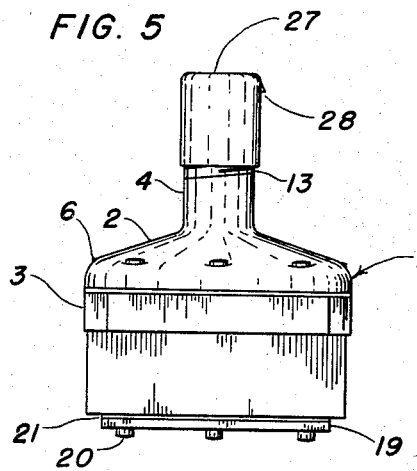
Fig. 5 is a side elevational view.
Figure 6:
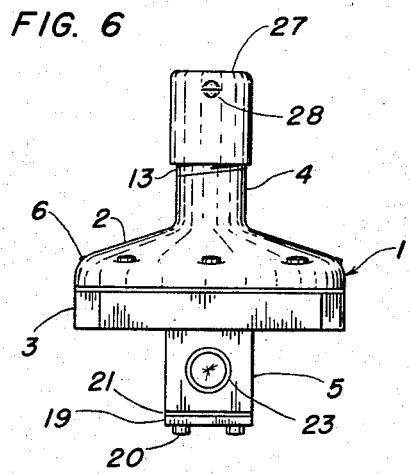
Fig. 6 is a side elevational view taken at right angles to the view shown in Fig. 5.

Referring to the drawing, the automatic gas cut off valve of the invention includes a housing, indicated generally by the numeral 1, having an upper section 2 and a lower section 3.

The upper section 2 is generally circular, as viewed in plan, while the lower section 3 is substantially square, the diameter of the upper section 2 corresponding to the width of the lower section 3. The upper section 2 has an integral upstanding cylindrical portion 4 of reduced diameter, open at its upper end, positioned centrally thereof, and the lower section 3 has an integral depending rectangular portion 5, of reduced width, positioned centrally thereof.

The upper section 2 and the lower section 3 are connected in mutually opposed relation to each other by a plurality of circumferentially spaced screws 6, which are passed thru openings therefor in the upper section 2, adjacent its periphery, and received in threaded openings therefor in the opposed surface of the lower section 3.

Circular cavities 7 and 8, which are formed in the opposed surfaces of the upper and lower sections 2 and 3, respectively, together form a chamber which encloses a flexible diaphragm 9. The diaphragm 9 is disposed horizontally between the opposed surfaces of the upper and lower sections 2 and 3, and has a marginal portion thereof clamped between them by the screws 6.

A vertically disposed valve stem 10 is passed thru a central opening therefor in the diaphragm 9, and extends above and below it, the upper end of the stem 10 being disposed centrally of the upstanding cylindrical portion 4 and extending upwardly above it. The diaphragm 9 is adjustably secured to the stem 10 by a pair of nuts 11, which are threaded on the stem 10 and positioned on opposite sides of the diaphragm 9. A pair of annular reenforcing plates 12 are disposed on opposite side of the diaphragm 9, centrally thereof, between the diaphragm 9 and the nuts 11.

An externally threaded annular member 13 surrounds the upper end of the stem 10 and is adjustably secured in the upstanding cylindrical portion 4, which is threaded internally. The annular member 13 serves as a guide for the upper end of the stem 10 and as a seat for a compression spring 14, which acts on the diaphragm 9 and the annular member 13 to bias the diaphragm 9 downwardly.

A tapered valve element 15 is removably connected to the lower end of the stem 10, and is movable reciprocally therewith in response to the action of the diaphragm 9.

The valve element 15 is received in a central bore 16 which is formed in the lower section 3, below the circular cavity 8, and communicates therewith at its upper end. The upper portion of the bore 16 is cylindrical, while the lower portion thereof is tapered and forms a seat for the valve element 15.

A plate 17, which closes the upper end of the bore 16, has a central opening therein surrounding the stem 10. The plate 17 serves as a guide for the lower end of the stem 10, and limits upward movement of the valve element 15.

A rectangular cavity 18, which is formed in the under side of the depending rectangular portion 5, is in fluid communication with the lower end of the bore 16, below the valve seat. The cavity 18 serves as a fluid passage, as hereinafter described, and is covered by a plate 19, which is secured to the under side of the depending rectangular portion 5 by screws 20. A gasket 21 is positioned between the cover plate 19 and the under side of the depending rectangular portion 5.

Inlet and outlet openings 22 and 23 are formed in opposite ends of the depending rectangular portion 5. A fluid passage 24 communicates at its ends with the inlet opening 22 and the tapered portion of the bore 16 which comprises the valve seat. A fluid passage 25 communicates at its ends with the fluid passage comprising the cavity 18, and with the cavity 8 below the diaphragm 9. A fluid passage 26 communicates at its ends with the cavity 8 below the diaphragm 9, and with the outlet opening 23.

A cup shaped cover 27, which has a vent 28 therein, is threaded on the upper end of the upstanding cylindrical portion 4 and provides a closure therefor.

In the operation of the automatic gas cut off valve of the invention, the cover 27 is first removed, and the valve element 15 is disengaged from the valve seat 16 by lifting the valve stem 10. At the same time the gas is turned on, whereby the cut off valve is maintained in its open position by the pressure of gas on the under side of the diaphragm 9.

Upon failure of the gas supply, whereby the pressure on the under side of the diaphragm 9 is reduced, the cut off valve is automatically closed, by the action of the compression spring 14 on the upper side of the diaphragm 9, and remains closed until it is reset as above described.

The invention may be modified in various ways without departing from the spirit and scope thereof.

I claim:

An automatic gas cut off valve comprising a housing having first and second sections defining between them a diaphragm chamber, the first section having a central bore extending outwardly from the diaphragm chamber, thru the outermost part of the section, threaded throughout its length, the second section having a central bore extending away from the diaphragm chamber and terminating in a tapered portion adjacent one end forming a valve seat, the second section having an inlet and an outlet in opposite sides thereof, a fluid passage in the second section communicating at its ends with the inlet and with the tapered portion of the last mentioned bore forming the valve seat, a recess in one end of the second section communicating with the last mentioned bore outwardly of the valve seat, the recess having a cover positioned to close and form a fluid passage, a fluid passage in the second section communicating at its ends with the recess and with the diaphragm chamber, a fluid passage in the second section communicating at its ends with the diaphragm chamber and with the outlet, a flexible diaphragm operatively positioned in the diaphragm chamber, between the first and second sections, a tapered valve element movable reciprocally in the last mentioned bore and engageable with the valve seat, a valve stem connected to the valve element and extending outwardly therefrom, thru the diaphragm, the diaphragm being connected to the valve stem intermediate its ends whereby the valve is positioned to be maintained in its open position in response to the pressure of gas on the side of the diaphragm facing the second section, a compression spring surrounding the valve stem and acting on the side of the diaphragm facing the first section whereby the valve is biased closed, an externally threaded annular member adjustably positioned in the first mentioned bore, surrounding the valve stem, for use as a guide for one end of the valve stem and as a seat for one end of the compression spring, and a plate having an opening therein surrounding the other end of the valve stem and removably connected to the second section, between the valve element and the diaphragm chamber, for use as a guide for the other end of the valve stem and to limit the movement of the valve element in an opening direction.

References Cited in the file of this patent

UNITED STATES PATENTS

| | | |
|---|---|---|
| 924,257 | Miller | June 8, 1909 |
| 1,309,482 | Leonardi | July 8, 1919 |
| 2,346,223 | Lyon | Apr. 11, 1944 |
| 2,688,975 | Born | Sept. 14, 1954 |
| 2,879,790 | Ey | Mar. 31, 1959 |

FOREIGN PATENTS

| | | |
|---|---|---|
| 661,069 | Germany | June 10, 1938 |